United States Patent
Vaidyanathan et al.

(10) Patent No.: US 7,240,340 B2
(45) Date of Patent: Jul. 3, 2007

(54) SYSTEM AND METHOD FOR BROWSE INFORMATION PARSING WITHOUT COMPILATION

(75) Inventors: Shankar Vaidyanathan, Sammamish, WA (US); David S. Waggoner, Bothell, WA (US)

(73) Assignee: Microsoft Corporation, Redmond, WA (US)

(*) Notice: Subject to any disclaimer, the term of this patent is extended or adjusted under 35 U.S.C. 154(b) by 495 days.

(21) Appl. No.: 10/218,142

(22) Filed: Aug. 12, 2002

(65) Prior Publication Data
US 2004/0031016 A1    Feb. 12, 2004

(51) Int. Cl.
G06F 9/45    (2006.01)
(52) U.S. Cl. .................... 717/143; 717/110
(58) Field of Classification Search .............. 717/143, 717/110, 116, 110, 143
See application file for complete search history.

(56) References Cited

U.S. PATENT DOCUMENTS

| | | | |
|---|---|---|---|
| 6,122,647 A | 9/2000 | Horowitz et al. | 707/513 |
| 6,182,281 B1 * | 1/2001 | Nackman et al. | 717/116 |
| 6,305,008 B1 | 10/2001 | Vaidyanathan et al. | 717/4 |
| 6,311,323 B1 | 10/2001 | Shulman et al. | 717/1 |
| 6,367,068 B1 * | 4/2002 | Vaidyanathan et al. | 717/143 |
| 6,502,233 B1 * | 12/2002 | Vaidyanathan et al. | 717/101 |

OTHER PUBLICATIONS

Wiil, U. K., "Development Tools in Component-Based Structural Computing Environments," Conference title: *Hypermedia: Openness, Structural Awareness, and Adaptivity, International Workshops OHS-7, SC-3, and AN-3, Revised Papers*, Aug. 14-18, 2001, Aarhus, Denmark, Reich, S. et al., (Eds.), Springer —Verlag, Berlin Germany, pp. 82-93.

Web Printout: www.wholetomato.com, Whole Tomato Software, Product Features, 1 page, Auto Completion, 5 pages, Auto Correction, 5 pages, Auto Type Info, 4 pages, Auto Parameter Info, 2 pages, Formatting, 4 pages, Miscellaneous, 8 pages, Date printed: Jun. 5, 2002.

Web Printout: www.devx.com, Tool Review by John Pearson, "An Editor With Attitude," 2 pages, Date printed: Jun. 5, 2002.

Web Printout: www.sourcedync,com, Source Dynamics, Inc., 56 pages, Date printed: Jun. 5, 2002.

Middel, C. D., "Software configuration und change management," *Conquest 2001, 5th Conference on Quality Engineering in Software Technology*, September 20-21, 2001, 239-245 (English abstract bottom of page 241).

(Continued)

Primary Examiner—Wei Zhen
Assistant Examiner—Chih-Ching Chow
(74) Attorney, Agent, or Firm—Woodcock Washburn LLP (57) ABSTRACT

A dynamic browse information parser captures the location within a program at which symbols exist. The dynamic browse information parser also parses function bodies, capturing location of symbols within the function body. Upon selection of a symbol and type of information desired, a datastore of browse information is queried. If additional information is required for disambiguation, the dynamic browse information parser parses the source code again to find the indicated browse information. Optionally the browse information is displayed in a window.

31 Claims, 6 Drawing Sheets

OTHER PUBLICATIONS

Briedenbach, G., "Programmable Keyboard Controller", *Electronic Praxis*, 2001, 6, 68-70 (English Language Abstract).

Holmes, N., "Seven Great Blunders of the Computing World", *Computer*, 2002, 110-112.

Zagler, W.L.., "Text Generation for Disabled Persons Using Word Prediction", *OEGAI-Journal*, 2001, 20(2), 21-22 (English Language Abstract).

IBM Research/Eclipse, http://www.research.ibm.com/eclipse, Home page , 2 pages.

JetBrains IntelliJ IDEA- the best Java IDE around, http://www.intellij.com, 1 page.

Slickedit;Code Editor, C++Editor, Java Editor, HTML Editor, XML Editor, Unicode Editor, http://www.slickedit.com, 1 page.

Source Insight Program Editor and Analyzer, http://www.sourcedyn.com/index.html, 2 pages.

Borland, CodeWright- The Programmer's Editing System, http://www.premia.com, 1 page.

Chalmers-Physical Resource Theory, "The Complex Adaptive Systems Programme of year 2000", http://www.frt.fy.chalmers.se/kristian/software.html, 1 page.

Emacs/W3 v 4.0, http://www.cs.indiana.edu/elisp/w3/docs.html, 1 page.

Vi: A Unix text editor, http://www.indiana.edu/~ucspubs/b104/ztoc.html, 8 pages.

Anderson, K.M. et al., "Chimera: Hypertext for Heterogeneous Software Environments", *Association for Computing Machinery*, 1994, *ECHT '94 Proceedings*, Department of Information and Computer Science, University of California, Irvine California, USA, 94-107.

Hughes, G. et al., "Microsoft Smart Tags: Support Ignore or Condemn Them?", *Association of Computing Machinery*, Jun. 11-15, 2002, 80-81.

Lewis, P.H. et al., "Media-based Navigation with Generic Links", *Association of Computing Machinery*, 1996, The Multimedia Research group, Department of Electronics and Computer Science, University of Southhampton, England, 215-223.

Middel, C.D., "Software Configuration and Change Management", *Proceedings 5th Conference on Quality Engineering in Software Technology*, 2001, 239-245 (English Language Abstract).

Jewell, D. "Windows Shell Secrets", *EXE*, 1999, 13(9), 35-45.

Kramer, B. "3D LISP Tools", *Cadence*, 1989, 4(5), 130-134.

Lin, C.F. et al., "Chinese Text Distinction and Font Identification by Recognizing most Frequently Used Characters", *Image and Vision Computing*, 2001, 19, 329-338.

\* cited by examiner

SYSTEM AND METHOD FOR BROWSE INFORMATION PARSING WITHOUT COMPILATION

FIELD OF THE INVENTION

This invention relates to the field of computing and in particular to the field of development tools.

BACKGROUND

As software increases in complexity, the development of software is becoming more and more difficult. Development of software is increasingly evolving from a solitary occupation into a team effort, making it necessary for a developer to be familiar with and use source code he did not write. Thus it is more and more important to be able to browse information concerning symbols defined in source code (e.g. functions, classes, properties, namespaces, macros, attributes and type definitions, etc).

For example, perhaps a developer is reading a program that makes a function call. It may be helpful for the developer to know all the places where the function is called from, and where the function is defined. That is, if the developer calls the function "foo" in [one] place in the source code, it is helpful to know that "foo" is also called by [these other] places in the source code, and that function "foo" is defined in [this] place in the source code. If a developer is considering making a change to a function definition, it would be helpful to know where the function is used so that the developer can determine how the change will impact each situation in which the function is used. It might be helpful to know what symbols a given function uses or what classes are derived from a certain class, and so on. Particularly when looking at source code the developer has not written or when a program is large, such browse information is invaluable to obtain an understanding of and work with the program.

Typically, however, in order to generate this browse information, the program must be fully compilable. Compilers typically generate browse information during compilation. This information can be very helpful to further program development. For example, development tools may use the browse information generated by the compiler to display reference information. There are, however, a number of drawbacks associated with using browse information generated by a compiler.

One of the drawbacks with generating browse information with a compiler is that it is not always feasible to compile the program, making the browse information unavailable. The program may be uncompilable because the source code has errors in it that prevent it from being compiled. In addition, there are cases where it is very difficult to know all the settings and commands needed to compile the program.

Even if the program has been compiled, the browse information is only correct up to the most recent compile. As new source code is added, the browse information generated by the compiler becomes more and more outdated, detracting from its usefulness. For example, if the developer originally places calls to function "foo" in his source code, and compiles the program, browse information for function "foo" will exist in the browse information generated by the compiler. If subsequently the developer removes all the calls to function "foo", the browse information will still erroneously contain the outdated browse information for function "foo" until the next compile. Because the compilation process itself can consume a non-trivial amount of time, explicit compilation may be infrequently initiated, compounding the problem.

Thus it would be helpful to be able to generate browse information dynamically so that changes to the source code are immediately reflected in the browse information, without having to recompile the program.

Dynamic parsers exist that attempt to address the shortcomings of compiler-generated browse information. One dynamic parser is described in U.S. Pat. No. 6,367,068 B1 issued Apr. 2, 2002, entitled "Dynamic Parsing".

A dynamic parser typically dynamically parses the source code that has changed since the last time it parsed (e.g., the developer has modified the source code, or a new version of the source code has been installed). Such a parser typically checks for changes using a predetermined heuristic, such as at fixed intervals such as every second, when the developer completes writing a statement or when the developer is inactive or idle, without waiting for the developer to initiate compiling. The parser may identify errors and warnings in the source code, and display limited information such as the members belonging to a class. Typically, source code is parsed for declaration and definition information. However, this declaration and definition information on symbols such as functions is frequently limited to return types and parameters, while the body of the function typically is not parsed for symbol information. Hence, browse information concerning the source code contained within the function body is not available from the dynamic parser. Some development tools available today do provide information concerning the source code contained within the function body. Typically, however, these editors provide this functionality by doing a text search through source code to find all occurrences of the name of a symbol. For example, if a portion of the source code contained the lines:

```
000001          namespace N1
000002          {
000003              void foo( )
000004              {
000005                  // I'm N1::foo
000006              }
000007          }
000008          namespace N2
000009          {
000010              void foo( )
000011              {
000012                  //I'm N2::foo
000013              }
000014          }
000015          using namespace N1;
000016          void bar( )
000017          {
000018              //...foo is here
000019              foo( );
000020              str = "Hello foo";
000021              N2::foo( );
                    . . .
000026          }
``` and a developer wanted to find every place that the function "N1::foo" was referenced, a development tool that does a text search would find the occurrences of "foo" on lines 000003, 000005, 00010, 00012, 00018, 00019, 00020, and 00021, which is incorrect. The only occurrences are on line 000003 which is the definition of N1::foo and line 00019, which is a call to "N1::foo". Hence it would be helpful if a dynamic browse information parser existed that could dynamically generate browse information, including source code contained within a function body, and could distinguish calls made to a function, from calls made to a different function with the same name, and from comments and strings containing the function's name (i.e., that would be as smart as a compiler) without explicitly invoking a compiler.

SUMMARY OF THE INVENTION

A dynamic browse information parser captures the location of all symbol names within a program's source code, including symbol names within a function body. A specific type of browse information is requested for a specific symbol. The type of browse information available may include: all references to the requested symbol; all functions called by the requested symbol where the symbol is a function; class hierarchical information for the requested symbol when the symbol is a class struct or an interface (what classes are derived from the requested symbol and what class(es) the requested symbol derives from) and the like. Upon request of a symbol and a type of browse information, a dynamic browse information parser identifies all browse information indicated. When a request is entered, the generated symbol name location information is queried.

If additional computation is required (e.g. if the generated symbol name location information is not sufficient to correctly identify the requested browse information) the dynamic browse information parser performs additional parsing at that time to identify all browse information indicated for the requested. Optionally the browse information is displayed in a window.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Exemplary Computing Environment

Figure 1:
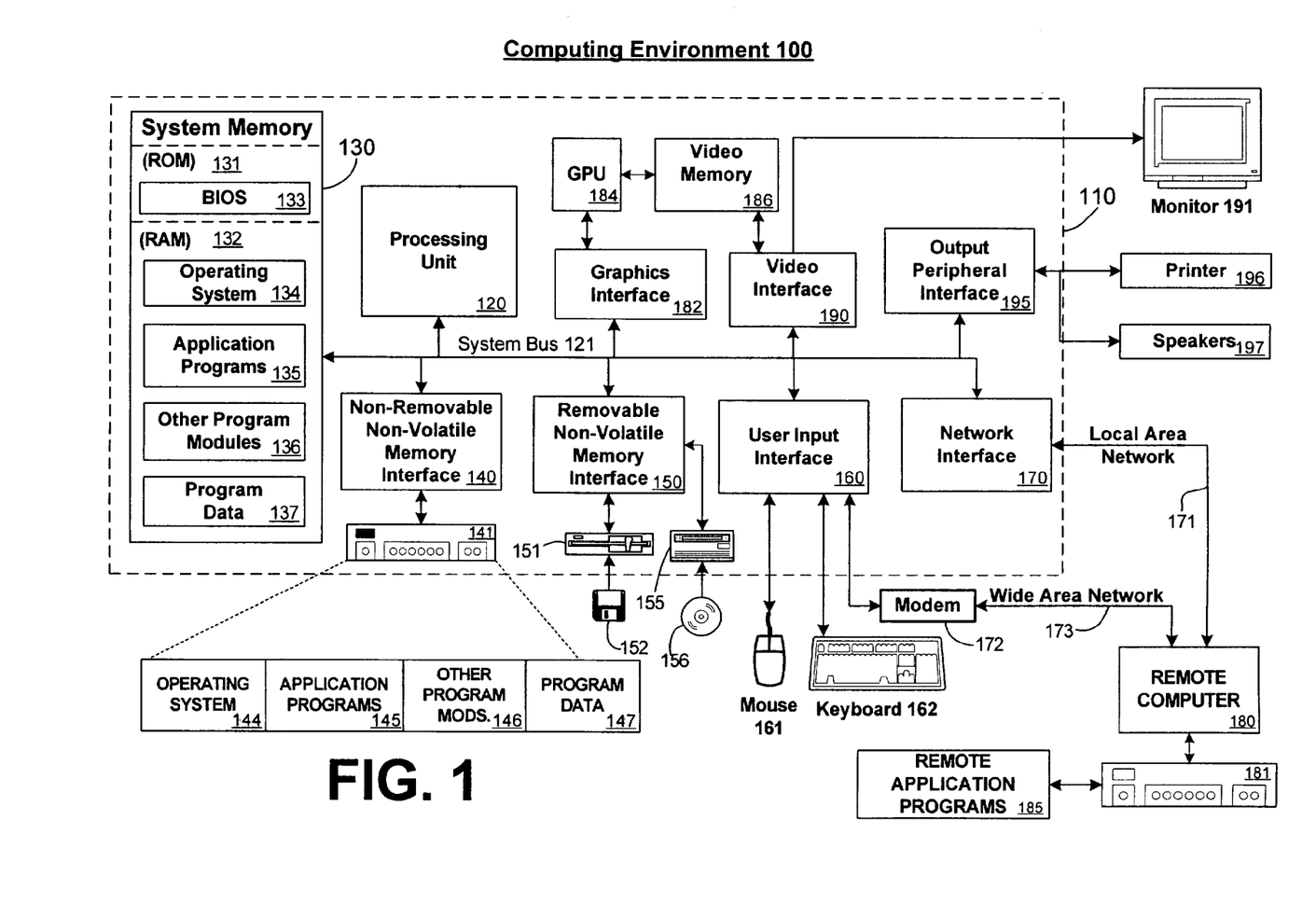
FIG. 1 is a block diagram of an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Generation of Dynamic Browse Information

A dynamic browse information parser captures the location of all symbol names within a program's source code. It will be understood by one skilled in the art, that as used herein, "source code" refers to the text that encodes a software program and encompasses the concepts of "code", "source file", "header", "source", "module" and the like. Similarly, one skilled in the art will understand the word "program", as used herein to encompass the concepts referred to as "project", "system", "application" and the like.

A specific type of browse information is requested for a specific symbol. The type of browse information available may include all references to the requested symbol, all functions called by a requested symbol where the symbol is a function, class hierarchical information for the requested symbol when the symbol is a clas struct or an interface (what classes are derived from the requested symbol and what class(es) the requested symbol derives from) and the like. Upon request of a symbol and a type of browse information, a dynamic browse information parser identifies all browse information indicated. When a request is entered, the generated symbol name location information is queried.

If additional computation is required (e.g. if the generated symbol name location information is not sufficient to correctly identify the requested browse information) the dynamic browse information parser performs additional parsing at that time to identify all browse information indicated for the requested symbol. Optionally the browse information is displayed in a window.

Figure 2:
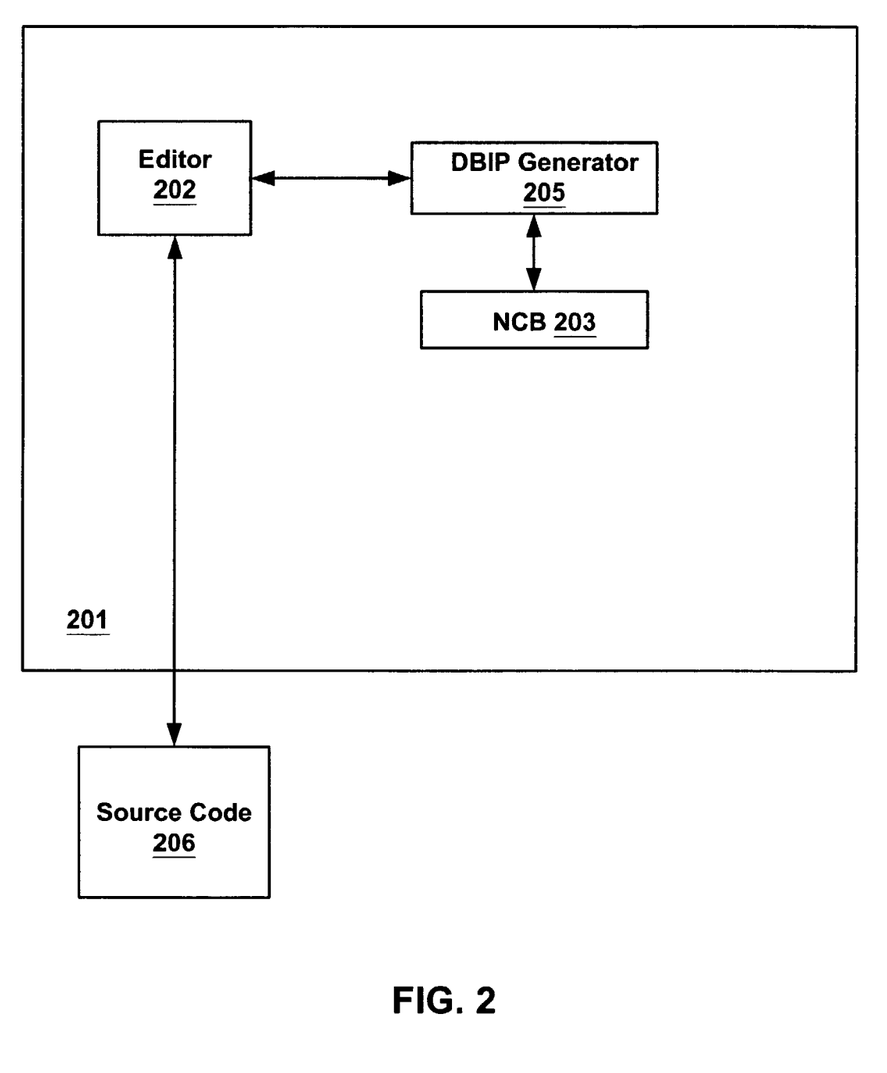
FIG. 2 is a block diagram of a system that dynamically generates browse information in accordance with one embodiment of the invention.

FIG. 2 is a block diagram illustrating an exemplary system for dynamically generating browse information in accordance with one embodiment of the invention. The system includes a dynamic browse information parser 205, a No-Compile-Browse file/database 203, and an editor 202 for writing and editing source code 206. Source code 206 typically is a set of instructions that a programmer or developer types or edits, and is written in a given programming language or combination of programming languages.

Editor 202 in one embodiment is part of a design environment 201, and facilitates the development of the source code 206 of a computer program. Thus, in accordance with one embodiment of the invention, a design environment 201 is accessed to write source code 206 within an editor 202. It will be understood that editor 202 is a type of development tool and use of any suitable development tool is contemplated by the invention. Similarly, it will be understood that design environment 201 may comprise any number of development tools of which editor 202 may be one.

The design environment 201 may include a dynamic parser (not shown). As the source code 206 is written, the dynamic parser may parse the source code 206 to determine errors. The dynamic parser may parse the source code 206 at predetermined intervals, such as, but not limited to, every second, every half-second, at the end of every line of source code, or during an idle cycle. As the dynamic parser parses the source code 206, the dynamic parser may identify errors found in the source code 206, indicating those errors to an editor, which then identifies the errors found by the dynamic parser within the source code 206. The editor may accomplish this by underlining a corresponding section of the source code 206 in which the error or errors were found. Hence, the dynamic parser continuously (dynamically) checks the entered source code 206 for errors and does not have to wait for the developer to initiate compilation.

Dynamic parsing may be accomplished in two stages. In a first stage, headers, source files, and class information (e.g., function, class, method, property, namespace, declaration, definition, macro, attribute, type definition and other such information), are parsed. The information generated on functions may be limited to the return types and parameters of the function so that the body of the function may not be parsed.

During the first stage a dynamic parser No-Compile-Browse (NCB) file or database may also be built. While a traditional (static) parser produces object modules, no such modules may be produced by the dynamic parser. Information such as how various functions, classes, methods, attributes, typedefs, structs, declarations, macro declarations, #include, #import, references, global variables, namespaces, templates, etc., are defined and where they are located are non-limiting examples of the type of information stored in dynamic parser NCB database/file.

In the second stage, the body of the function may be parsed, to identify syntax and potential semantic errors and to display them. In the second stage, the dynamic parser NCB may be queried to determine errors, such as missing end of line characters, opening or closing braces, unknown or undeclared identifiers, incorrect argument lists and so on. The second stage of parsing does not necessary follow the first stage of parsing. In one embodiment, the stages are performed asynchronously.

The dynamic parser NCB database/file may be an external database including dynamic information from the code being analyzed, and pre-built information from libraries that the source code may utilize, such as but not limited to the Microsoft Foundation Classes. The difference between the dynamic and pre-built information is that the latter is already built into the dynamic parser NCB database/file, since it is assumed that a developer will be relying on one or more of the libraries when creating his own program, while the dynamic information may be generated while the user is developing code. The dynamic parser may use a database engine so that the dynamic parser NCB database/file can be added to, can be searched, and so on. The database engine used can be any suitable database engine.

Dynamic browse information parser 205 incorporates the dynamic parser described above. Alternatively, dynamic browse information parser 205 may exist separately, with or without the dynamic parser, within a design environment 201.

Dynamic browse information parser 205 in accordance with one embodiment of the invention, in a first parsing stage, dynamically parses the changes to source code 206 at predetermined intervals, such as, but not limited to, every second, every half second, at the end of every line of source code, or during an idle cycle. In one embodiment, the parsing takes place in background. The dynamic browse information parser 205 parses the source code for symbols, capturing the location of each symbol in the source code. Symbols, as used herein, include functions, variables, interface names, class names, macros, struct names, union names, typedef names, enum names, enum member names, file names and the like. In one embodiment symbol names are case-sensitive. The dynamic browse information parser 205 in one embodiment distinguishes between overloaded functions with the same name. An overloaded function uses the same name as a previously defined function, but a different number or type of parameters is passed to the function. The dynamic browse information parser also distinguishes between the name of a function defined or referenced in one namespace from the same name defined or referenced in another namespace. The dynamic browse information parser 205 also parses function bodies for internal symbols and captures these internal symbols and the location at which the symbols occur within the function body of the source code. The dynamic browse information parser 205 thus continuously (dynamically) parsers the entered source code 206 for symbols and stores the location of the symbols in a datastore, without the need for compilation. In one embodiment the location captured is the line number of the source code file in which the symbol occurs. The location information is persisted in a dynamic browse information parser No-Compile-Browse (NCB) file or database 203. The dynamic browse information parser NCB file/database 203 may be a modified dynamic parser NCB file/database, as described above. For example, the dynamic parser NCB file/database may be structurally modified to enable the location of the symbol to be stored.

The dynamic browse information parser 205 must be very fast. This consideration affects design decisions. To achieve the necessary speed, many heuristics are required, one of which is described herein. One example is the storage of symbol location in the NCB file/database 203. In one embodiment of the invention, a line number of the source code where the symbol occurs is stored in the dynamic browse information parser NCB file/database 203.

In a second parsing stage, upon user selection of a symbol and type of browse information desired, as described below, dynamic browse information parser 205 queries the dynamic browse information parser NCB file/database 203. The type of browse information requested may be any one or more of the following: all references to the requested symbol, all functions called by the requested symbol where the symbol is a function, what classes are derived from the requested symbol and what classes the requested symbol derives from (when the symbol is a class struct or an interface). If dynamic browse information parser NCB database/file 203 contains the appropriate reference information for the selected symbol, (if the generated symbol name location information is sufficient to correctly identify the requested browse information) this information is (optionally) displayed. Only if the required information available from dynamic browse information parser NCB database/file 203 is not sufficient, the dynamic browse information parser 205 performs additional parsing, parsing the references to determine the appropriate browse information. By not doing an explicit parse when it is not needed, significant efficiencies are achieved. Optionally the information is displayed. In one embodiment of the invention, the additional information generated by the second parsing stage is not persisted in dynamic browse information parser NCB database/file 203. By not storing this information, efficiencies in terms of memory and data storage space is achieved. Alternatively, the information generated by the dynamic browse information parser 205 is persisted to the dynamic browse information parser NCB database/file 203.

Figure 3:
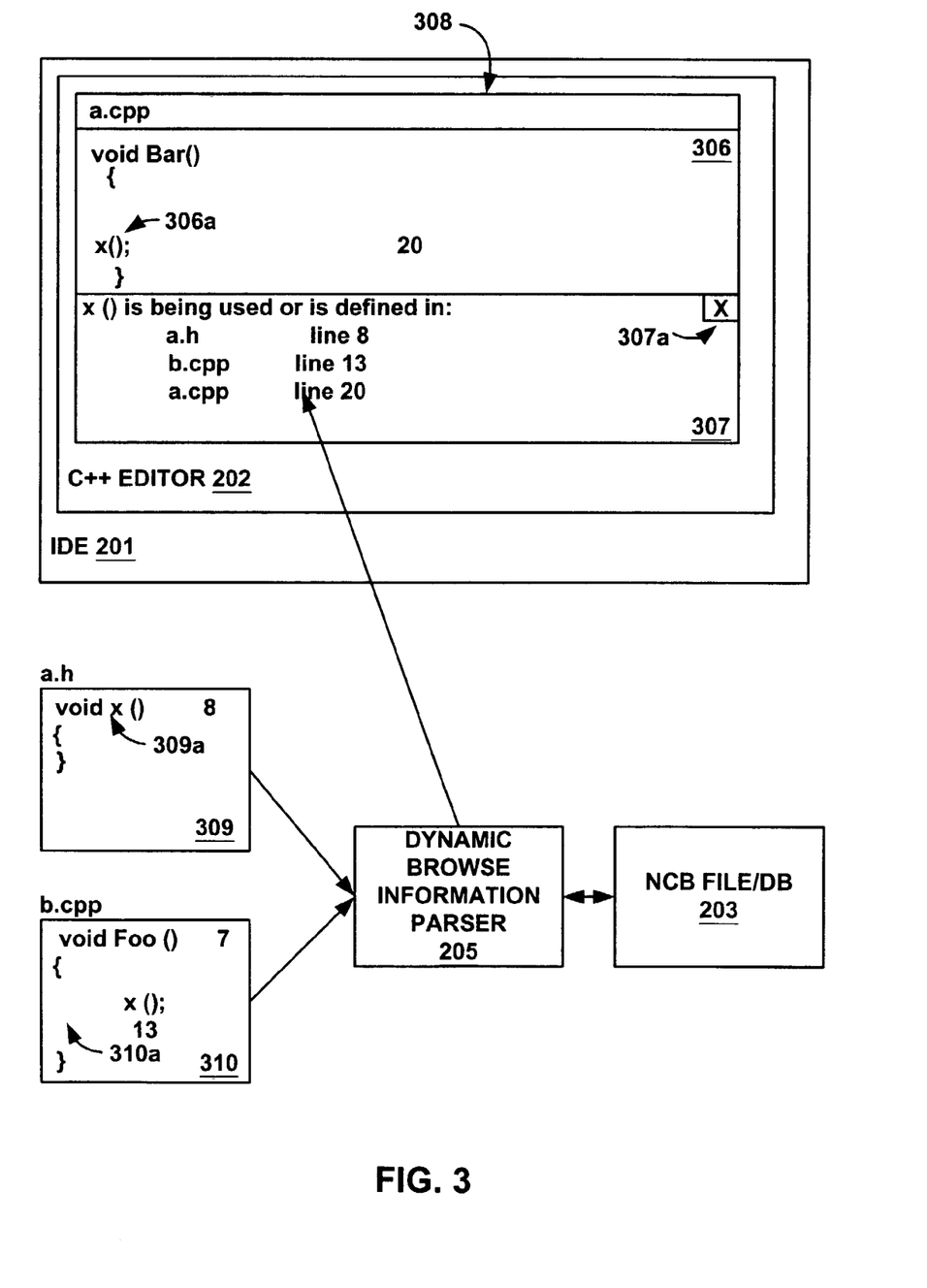
FIG. 3 is a block diagram illustrating a representative screen shot of an editor, a dynamic browse information parser and a no-compile-browse file (NCB), and three exemplary source code files.

FIG. 3 is a block diagram illustrating a representative screen shot of an editor, a dynamic browse information parser, a dynamic browse information parser No-Compile-Browse file (NCB) in accordance with one embodiment of the invention and three exemplary source code files. Within a design environment such as an Integrated Design Environment (IDE) 201, a C++ editor 202 enables the creation or editing of C++ source code 306 as depicted in window 308. Source code 306 is displayed within window 308. Dynamic browse information parser 205 generates dynamic browse information parser NCB file/database 203 entries when source code files 309 and 310 are created or edited. Upon selection of a symbol and the type of information desired with respect to the selected symbol, dynamic browse information parser NCB file/database 203 is queried. If dynamic browse information parser NCB file/database 203 includes the information desired, a window 307 displaying this information is generated. If dynamic browse information parser NCB file/database 203 does not include the information desired, dynamic browse information parser 205 parses the references to determine the appropriate information and (optionally) displays the information in window 307. Window 307 can be closed by clicking on 307a.

Figure 4:
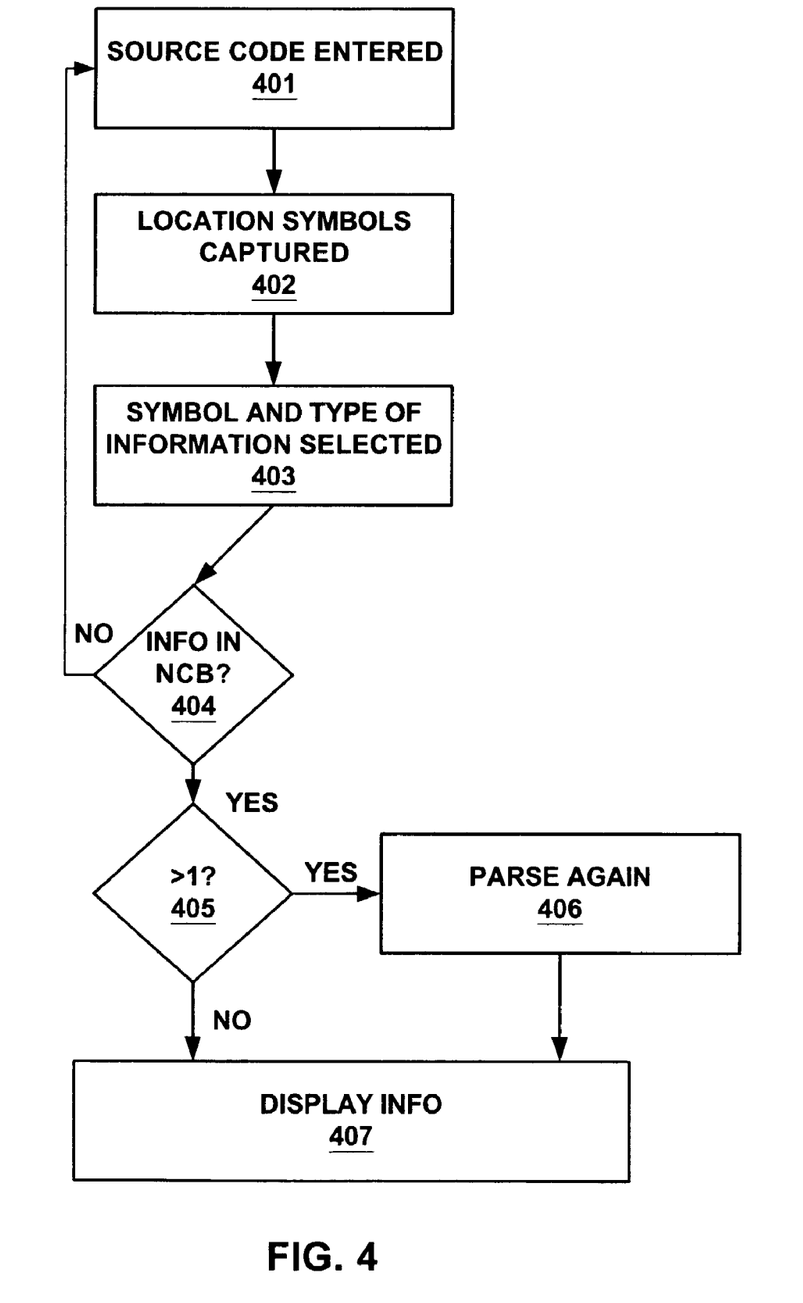
FIG. 4 is a flow diagram of a method for dynamically generating browse information in accordance with one embodiment of the invention.

FIG. 4 is a flow diagram of a method of dynamically generating browse information in accordance with one embodiment of the invention. At step 401, as source code is entered or edited, the source code is parsed (including the source code of function bodies) and the location of the symbols in the source code file are captured (step 402).

At step 403 a symbol for which browse information is to be generated is selected. A symbol for which browse information is to be generated may be selected by entering the name of the symbol in a dialog box, by selecting the symbol name in the source code by highlighting the symbol name or by clicking on the symbol name, and by selecting the symbol name from a list of symbol names, although other suitable methods for selecting a symbol name are contemplated. The type of information to be generated is selected. Types of information that may be generated include a list of all the locations of the selected symbol, a list of all the symbols referenced by the selected symbol, the hierarchical organization of classes within the program and the like, as discussed above.

At step 404, dynamic browse information parser NCB database/file 203 is queried. If the symbol is not found in dynamic browse information parser NCB database/file 203, no information can be displayed and processing continues at step 401. If information exists in dynamic browse information parser NCB database/file 203, it is determined whether the information available in dynamic browse information parser NCB database/file 203 is sufficient (e.g., the symbol name does not need to be disambiguated) to generate the appropriate browse information. If at step 405, it is determined that the browse information is sufficient, the browse information is optionally displayed at step 407, without requiring an explicit parse for the symbol. If at step 405, it is determined that the information in dynamic browse information parser NCB 203 is not sufficient (e.g., symbol name is ambiguous or overloaded), the appropriate browse information is generated by parsing the appropriate sections of source code where the ambiguous references were found and the exact browse information is optionally displayed at step 407.

It should be understood that steps 403, 404, 405, 406 and 407 etc. (the second parsing stage) may not necessarily follow steps 401 and 402 (the first parsing stage). In one embodiment of the invention, the stages are performed asynchronously.

Referring now concurrently to FIGS. 3 and 4, assume that source code files a.h 309 and b.cpp 310 have been previously written, so that the symbols in a.h 309 and b.cpp 310 have been entered in dynamic browse information parser NCB file/database 203 (steps 401 and 402). Assume that a developer writing source code in a.cpp 306 would like to see every location at which the function "x" is called in source code files. At step 403, the developer may, for example, right-click on the function name "x" 306a in the source code 306 on line 20 and select a "called by" option in an option box that appears in response to right-clicking the selected function "x". Function "x" is defined in exemplary program a.h on line 8 309a and is called by program b.cpp at line 13 310a in addition to line 20 of source code 306 for a.cpp. When a.h 309 was created or edited, the dynamic browse information parser NCB file/database 203 was updated with the location of the definition of function "x" in the source code file a.h line 8 309a. Similarly, when b.cpp 310 was created or edited, the NCB database/file 203 was updated with the location of the function call to function "x" in b.cpp on line 13 310a.

At step 404 the NCB file 203 is queried and the two references to "x" are found. Because there is only one definition of function "x", a reference to "x" is not ambiguous and no further parsing must be done (step 405). At step 407, a list of locations at which "x" can be found (a.h at line 8, b.cpp at line 13 and a.cpp at line 20) are displayed in window 307.

Figure 5:
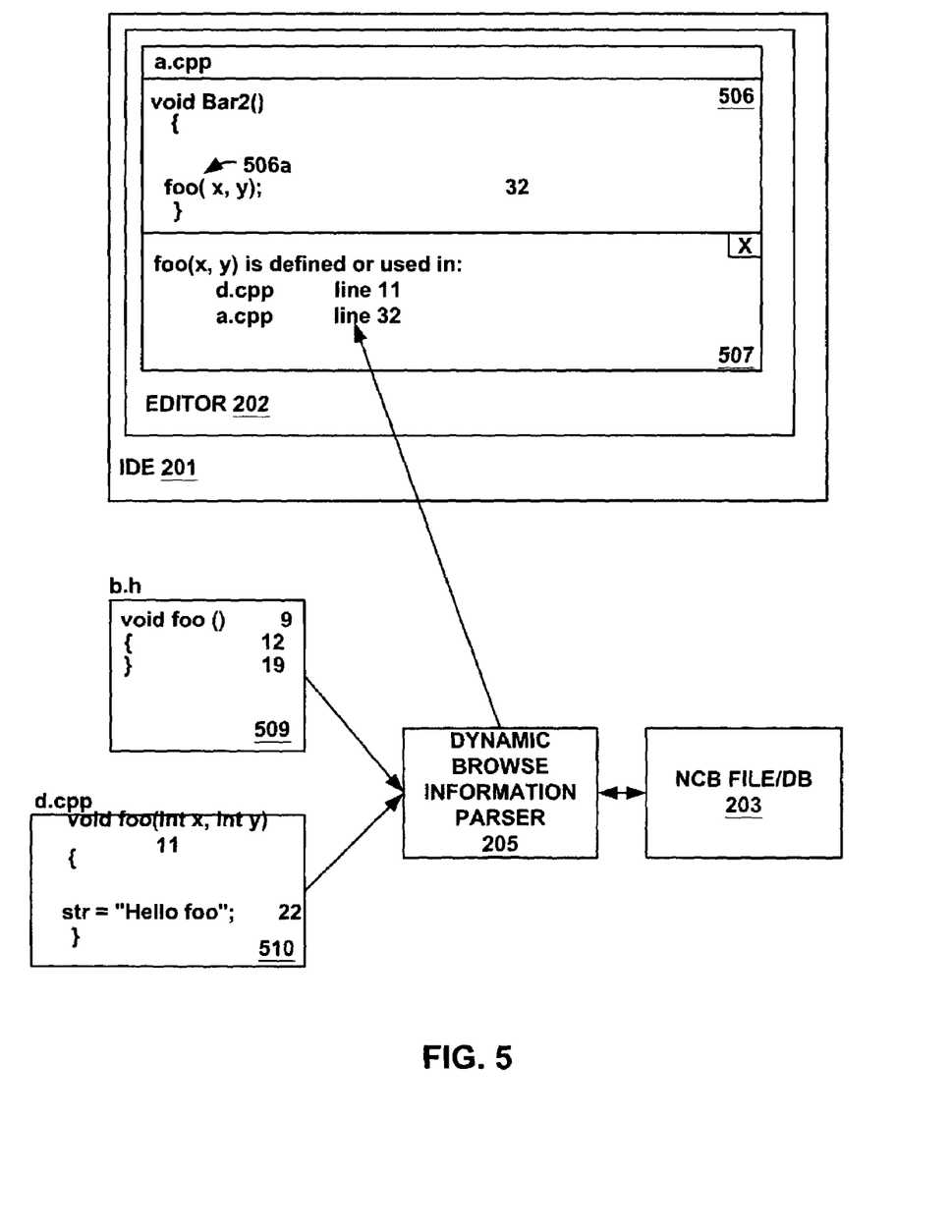
FIG. 5 is a block diagram illustrating another representative screen shot of an editor, a dynamic browse information parser and a no-compile-browse file (NCB) and three exemplary source code files.

FIG. 5 is a block diagram illustrating a second representative screen shot of an editor, a dynamic browse information parser, a dynamic browse information parser No-Compile-Browse file (NCB) in accordance with one embodiment of the invention and three exemplary source code files. Now assume that a developer writing source code in a.cpp 506 would like to find all the locations where the function "foo (x,y)" is called or defined. Assume that appropriate selection of symbol and type of information is made at step 403. When b.h 509 was created or edited, an entry was made in dynamic browse information parser NCB database/file 203 by dynamic browse information parser 205 that function "foo" was defined at line 9 in b.h 509. Similarly when d.cpp 510 was created or edited, an entry for function "foo" defined in d.cpp 510 at line 11 was made in dynamic browse information parser NCB database/file 203 by dynamic browse information parser 205. When "foo(x,y)" was entered at line 32 in a.cpp, an entry was made in dynamic browse information parser NCB database/file 203 by dynamic browse information parser 205 that function "foo" was called at line 32 in a.cpp. At step 404, dynamic browse information parser NCB database/file 203 is queried, and function "foo" is found. At step 405 dynamic browse information parser 205 determines that two functions "foo" exist. At step 406 dynamic browse information parser 205 distinguishes between function "foo( )" and function "foo (x,y)" by parsing b.h 509 and d.cpp 510 starting at lines 9 and 11 respectively and thus only displays the location of function "foo (x, y)" at line 11 in d.cpp 510 and at line 32 in a.cpp in window 507 at step 407. It should be noted that similarly, references calling function "foo( )" would be similarly parsed. Note also that the occurrence of "foo" in the string "Hello foo" (line 22 of d.cpp) is understood by dynamic browse information parser 205 not to be a reference to a symbol and thus is not displayed in window 507.

Figure 6:
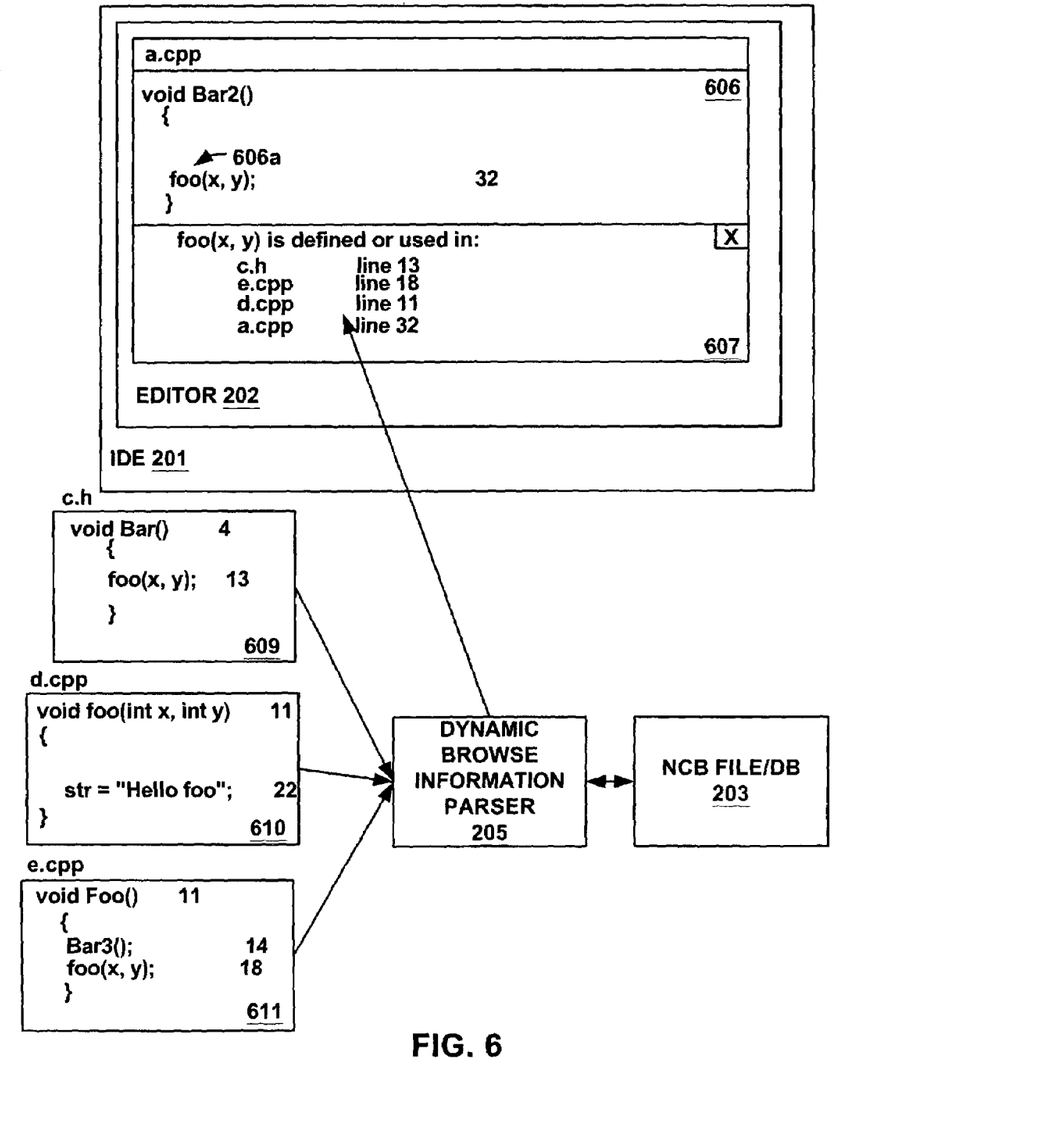
FIG. 6 is a block diagram illustrating a third representative screen shot of an editor, a dynamic browse information parser and a no-compile-browse file (NCB) and three exemplary source code files.

FIG. 6 is a block diagram illustrating a third representative screen shot of an editor, a dynamic browse information parser, and a dynamic browse information parser NCB database/file 203 in accordance with one embodiment of the invention, and four exemplary source files. When d.cpp 610 was created or edited, an entry was made in dynamic browse information parser NCB database/file 203 by dynamic browse information parser 205 for the definition of function "foo" at line 11. When c.h 609 was written or edited, an entry was made in dynamic browse information parser NCB database/file 203 by dynamic browse information parser 205 that function "Bar" was defined at line 4 in c.h 609. Dynamic browse information parser 205 also captures the information that the body of function Bar contains an embedded call to function foo at line 13. Similarly when e.cpp 610 was written or edited, an entry for function "Foo" located at line 11 is made in dynamic browse information parser NCB database/file 203 by dynamic browse information parser 205. Dynamic browse information parser 205 also captures the information that the body of function Foo includes a call to Bar3 at line 14 and a call to function foo at line 18. Similarly, when a.cpp was written or edited, an entry for function "foo" located at line 32 was made in dynamic browse information parser NCB database/file 203 by dynamic browse information parser 205.

Now assume that a developer writing or browsing source code in a.cpp 606 would like to find all the locations where foo (x,y) is called or defined. Assume that appropriate selection of symbol and type of information is made at step 403. At step 404, dynamic browse information parser NCB database/file 203 is queried, and function "foo" is found. At step 405 dynamic browse information parser 205 determines that two definitions of function "foo" exist so that disambiguation needs to occur. At step 406, the references to "foo" are parsed and dynamic browse information parser 205 determines that a reference to foo (x,y) can be found at line 13 in c.h 609, at line 18 in e.cpp 610 and at line 32 in a.cpp and that foo (x,y) is defined starting at line 11 in d.cpp 610. At step 407 dynamic browse information parser 205 displays that foo (x,y) is called at c.h 609 at line 13, in e.cpp 610 at line 18, in a.cpp at line 32 and is defined at d.cpp 610 at line 11, as displayed in window 607.

Now assume that a developer writing source code in a.cpp 606 would like to find all the locations where Bar3 is called or defined. Assume that appropriate selection of symbol and type of information is made at step 403. At step 404, dynamic browse information parser NCB database/file 203 is queried, and function "Bar3" is found. At step 405 dynamic browse information parser 205 determines that only one function "Bar3" exists so that no disambiguation needs to occur. At step 407 dynamic browse information parser 205 displays that Bar3 is found in e.cpp at line 14 (not shown.

Similarly, if the information requested is to display all symbols referenced by Bar( ), dynamic browse information parser 205 would query dynamic browse information parser NCB file/database 203 to display foo(x,y) at line 13 in c.h 609. Similarly, suppose in a program, classes circle, square and triangle derive from class shape. If class hierarchy information for all classes deriving from shape is requested, a display of the classes circle, square and triangle would be generated. Similarly, if the class from which circle is derived is requested, class shape would be displayed. For Example,

```
000001      class Shape
000002      {
000003      int Area( );
000004      };
000005      class Circle : public Shape
000006      {
000007      int Circumference( );
000008      };
```

The class hierarchical display in one embodiment is displayed graphically as a tree structure but suitable methods of displaying such information are well-known in the art and any suitable display format is contemplated by the invention.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A computer-based method for generating dynamic browse information, the method comprising:
    parsing dynamically a section of source code, during program editing using a two-stage parsing process comprising a first pass and a second pass and displaying results of the parsing process as the section of source code is being written, the section of source code comprising a function body; and
    for each symbol in the function body of the section of source code, capturing a location and parameter information of the symbol during the first pass in the dynamic browse information, wherein all references to the symbol, all functions called by the symbol, class hierarchical information for the symbol, or classes derived from the symbol are returned based on the dynamic browse information.

2. The method of claim 1, wherein the symbol comprises a variable.

3. The method of claim 1, wherein the symbol comprises an interface name.

4. The method of claim 1, wherein the symbol comprises a class name.

5. The method of claim 1, wherein the symbol comprises a macro.

6. The method of claim 1, wherein the symbol comprises a function name.

7. The method of claim 1, wherein the symbol comprises a template name.

8. The method of claim 1, wherein the symbol comprises a namespace name.

9. The method of claim 1, wherein the symbol comprises a struct name.

10. The method of claim 1, wherein the symbol comprises a union name.

11. The method of claim 1, wherein the symbol comprises a typedef name.

12. The method of claim 1, wherein the symbol comprises an enum name.

13. The method of claim 1, wherein the symbol comprises an enum member name.

14. The method of claim 1, wherein the location of the symbol is stored in a datastore.

15. The method of claim 1, further comprising in response to receiving a selected symbol and a type of information, querying a datastore and returning a list of locations associated with the type of information selected.

16. The method of claim 15, further comprising displaying the information selected.

17. The method of claim 15, wherein the type of information comprises at least one of a list of locations which reference the selected symbol, a list of symbols called by the selected symbol, a list of classes derived from the selected symbol, and a list of classes the selected symbol derives from.

18. The method of claim 15, further comprising displaying the information selected in a window while the section of source code is being edited.

19. The method of claim 15, wherein the method further comprises, in response to determining that more than one definition for the symbol is present in the datastore, parsing each of the definitions to determine the location of the selected symbol.

20. The method of claim 19, wherein the information returned from the parsing of each of the definitions is not stored in the datastore.

21. The method of claim 15, wherein the method further comprises, in response to determining that more than one reference to the selected symbol is present in the datastore, parsing each of the references of the selected symbol to determine the correct location of the selected symbol.

22. The method of claim 21, wherein the information returned from the parsing of the references is not stored in the datastore.

23. The method of claim 1, wherein the source code is C++.

24. A system for generating browse information, the system comprising:
    means for developing source code for a computer program for execution by a processor; and
    means for dynamically parsing the source code during program editing, using a two-stage parser comprising a first pass parser that captures a symbol, parameter information for the symbol and a location of the symbol in a function body of the source code in the browse information and that displays all references to the symbol, all functions called by the symbol, class hierarchical information for the symbol, or classes derived from the symbol based on the dynamic browse information as the source code is being written.

25. A system of claim 24, wherein the means for developing source code for a computer program comprises a C++ source program editor.

26. The system of claim 24, wherein the means for parsing the source code comprises a datastore for storing the symbol and the location of the symbol.

27. The system of claim 24, wherein the means for parsing the source code further comprises means for querying a datastore to determine whether a symbol selected by user input is included within the datastore.

28. The system of claim 24, further comprising means for disambiguating a reference to a symbol, the symbol associated with more than one definition.

29. The system of claim 26, further comprising a database engine for querying the datastore.

30. A computer-readable storage medium including computer-readable instructions for:

parsing dynamically a section of source code for a symbol during program editing, as the section is written using a two stage process comprising a first pass and a second pass;

for each symbol in a function body of the section of source code, generating dynamic browse information by capturing a location of the symbol and parameter information for the symbol during the first pass, wherein all references to the symbol, all functions called by the symbol, class hierarchical information for the symbol, or classes derived from the symbol are returned based on the dynamic browse information and presenting the results of the two stage process as the section is being written; and persisting the location of the symbol in a datastore.

31. The computer-readable storage medium of claim 30, comprises further computer-readable instructions for:

in response to receiving a symbol and a type of information, querying the datastore and displaying a list of locations associated with the type of information at which the symbol is referenced.

* * * * *